(12) United States Patent
Jung et al.

(10) Patent No.: US 12,061,759 B2
(45) Date of Patent: Aug. 13, 2024

(54) TOUCH SENSING DEVICE AND TOUCH DISPLAY DRIVING DEVICE FOR REDUCING ELECTROMAGNETIC INTERFERENCE

(71) Applicant: LX SEMICON CO., LTD., Daejeon (KR)

(72) Inventors: Hong Kyun Jung, Daejeon (KR); Sun Young Park, Daejeon (KR); Sung Chun Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/968,888

(22) Filed: Oct. 19, 2022

(65) Prior Publication Data

US 2023/0205348 A1 Jun. 29, 2023

(30) Foreign Application Priority Data

Dec. 27, 2021 (KR) .......................... 10-2021-0188280

(51) Int. Cl.
*G06F 3/041* (2006.01)
(52) U.S. Cl.
CPC .......... *G06F 3/0416* (2013.01); *G06F 3/0412* (2013.01)

(58) Field of Classification Search
CPC .. G06F 3/04164; G06F 3/0416; G06F 3/0446; G06F 3/04162; G06F 3/04166; G06F 3/0412
See application file for complete search history.

(56) References Cited

U.S. PATENT DOCUMENTS

2011/0157014 A1* 6/2011 Hachiya ................ G06F 3/0488
345/157
2020/0007364 A1* 1/2020 Akasaka ............. H04L 25/4923

FOREIGN PATENT DOCUMENTS

KR 10-0873159 B1 12/2008

* cited by examiner

*Primary Examiner* — Yaron Cohen
(74) *Attorney, Agent, or Firm* — ROTHWELL, FIGG, ERNST & MANBECK, P.C.

(57) ABSTRACT

Disclosed herein is a touch sensing device including a first touch controller configured to transmit and receive data, wherein the first touch controller includes a clock terminal and a plurality of input/output terminals, and ternary data is transmitted and received through the clock terminal and at least two terminals among the plurality of input/output terminals of the first touch controller, and binary data is transmitted through the remaining input/output terminals.

16 Claims, 10 Drawing Sheets

TOUCH SENSING DEVICE AND TOUCH DISPLAY DRIVING DEVICE FOR REDUCING ELECTROMAGNETIC INTERFERENCE

CROSS-REFERENCE TO RELATED APPLICATIONS

This application claims the benefit of the Korean Patent Applications No. 10-2021-0188280 filed on Dec. 27, 2021, which are hereby incorporated by reference as if fully set forth herein.

FIELD

The present disclosure relates to a touch sensing device and a touch display driving device.

BACKGROUND

As display devices for displaying images, liquid crystal displays (LCDs) using liquid crystals and organic light-emitting diode (OLED) displays using OLEDs are typical.

Recently, moving away from the usual input manners such as buttons, keyboards, and mouses, display devices having touch screen panels capable of detecting a touch input by a user's finger or a stylus pen (hereinafter referred to as "touch display devices") are widely used. The above-described touch display devices include touch sensing devices.

A touch display driving device for driving the touch display device includes a display driving device for driving a display device, and a touch sensing device for detecting the presence or absence of a touch and a touch coordinate (or a touch position). Specifically, the touch sensing device detects touch sensing data by driving touch sensors (or touch electrodes) and detects touch information including the presence or absence of a touch or a touch coordinate using the detected touch sensing data.

SUMMARY

Accordingly, according to the present disclosure, there are provided a touch sensing device for reducing the number of lines connecting between a plurality of touch controllers or connecting a plurality of readout integrated circuits and a touch controller and reducing an electromagnetic interference (EMI) noise.

According to an aspect of the present disclosure, there is provided a touch sensing device including a first touch controller configured to transmit and receive data, wherein the first touch controller includes a clock terminal and a plurality of input/output terminals, and ternary data is transmitted and received through the clock terminal and at least two terminals among the plurality of input/output terminals of the first touch controller, and binary data is transmitted through the remaining input/output terminals, and a method of driving the same.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure. In the drawings.

DETAILED DESCRIPTION

Figure 1:
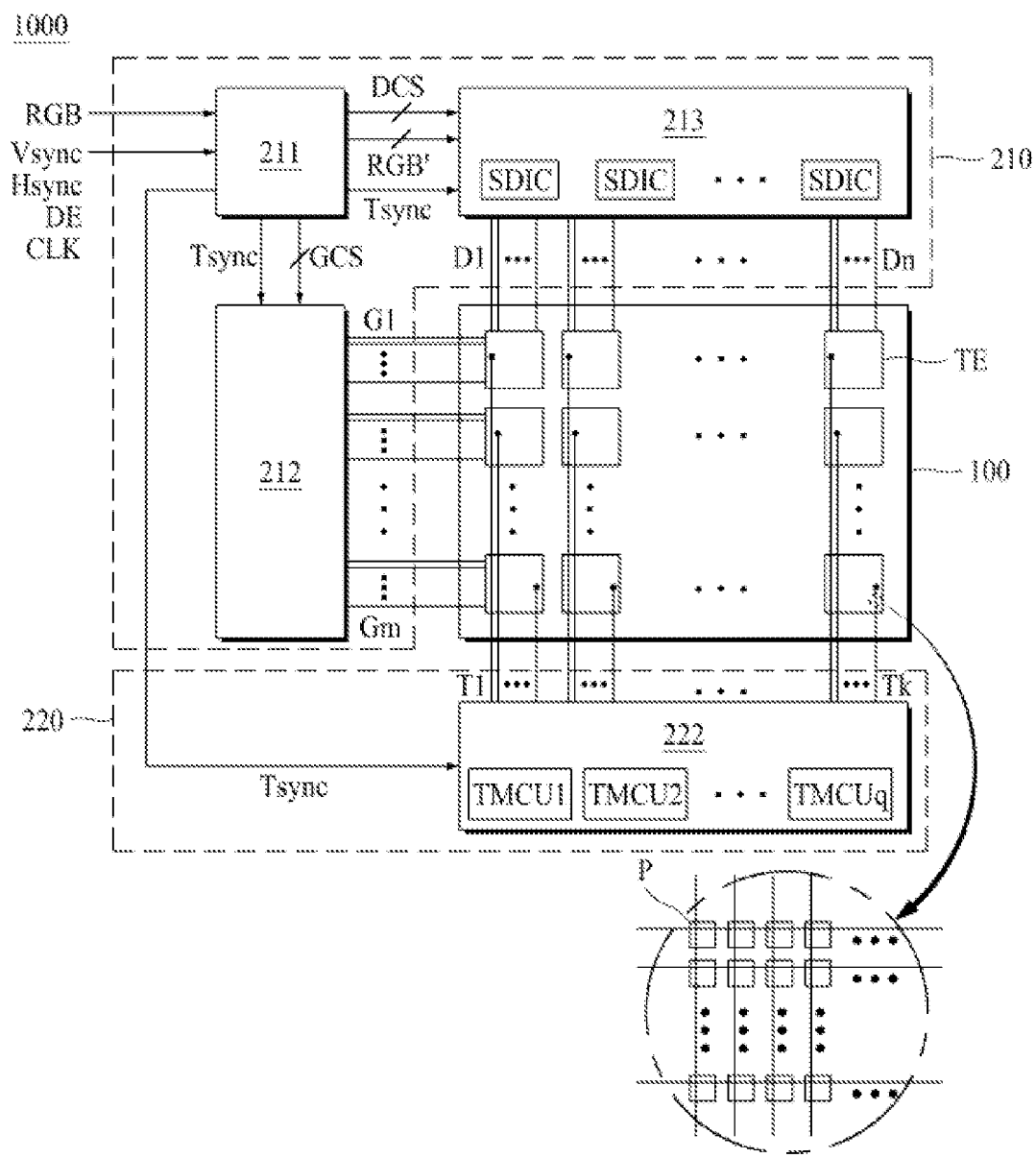
FIG. 1 is a block diagram illustrating a display device including a touch sensing device according to one embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a touch sensing device and a display device including the same according to the present disclosure will be described in detail with reference to FIGS. 1 to 5.

Figure 2:
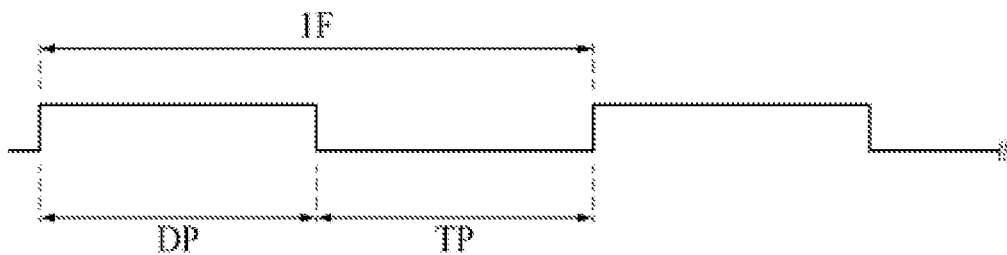
FIG. 2 is a timing diagram illustrating a configuration of one frame of the display device including the touch sensing device according to one embodiment of the present disclosure.
Figure 3:
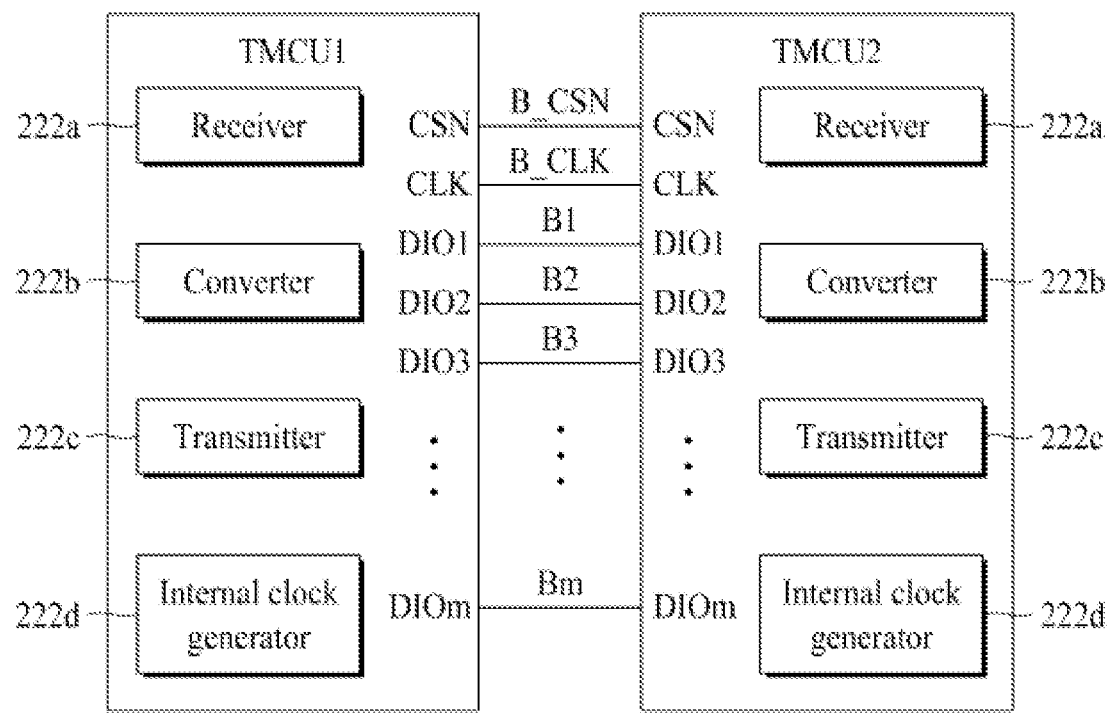
FIG. 3 is a diagram illustrating a connection relationship between a plurality of touch controllers.
Figure 4:
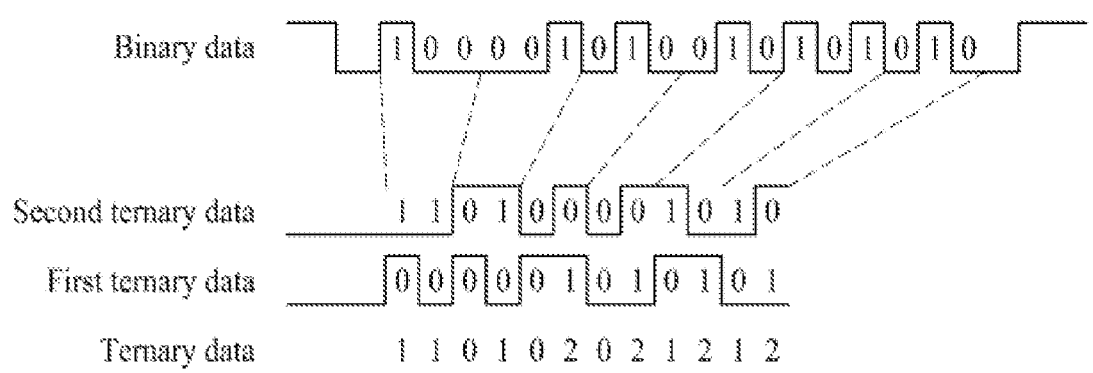
FIG. 4 is a diagram illustrating a correspondence relationship between binary data and ternary data according to one embodiment of the present disclosure.
Figure 5:
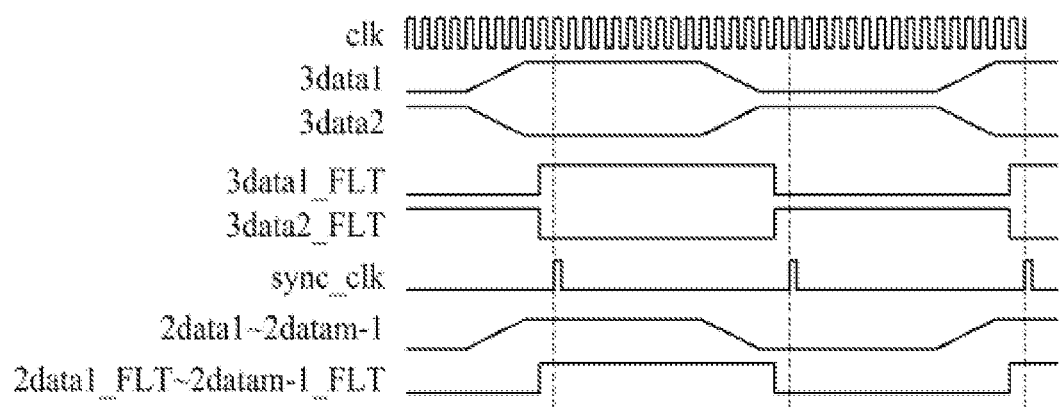
FIG. 5 is a timing diagram illustrating a synchronization method according to one embodiment of the present disclosure.

FIG. 1 is a block diagram illustrating a display device including a touch sensing device according to one embodiment of the present disclosure. FIG. 2 is a timing diagram illustrating a configuration of one frame of the display device including the touch sensing device according to one embodiment of the present disclosure. FIG. 3 is a diagram illustrating a connection relationship between a plurality of touch controllers. FIG. 4 is a diagram illustrating a correspondence relationship between binary data and ternary data according to one embodiment of the present disclosure. FIG. 5 is a timing diagram illustrating a synchronization method according to one embodiment of the present disclosure.

Referring to FIG. 1, a display device 1000 according to one embodiment of the present disclosure includes a display panel 100 and a touch display driving device. In this case, the touch display driving device includes a display driving device 210 and a touch sensing device 220.

The display device 1000 performs a display function and a touch sensing function and may be implemented as a flat panel display such as a liquid crystal display (LCD) or an organic light-emitting diode (OLED) display.

As shown in FIG. 2, the display panel 100 may be operated during a display period DP and a touch sensing period TP. The display panel 100 displays an image using light emitted from a backlight unit during the display period DP and serves as a touch panel for touch sensing during the touch sensing period TP.

The display panel 100 displays an image of predetermined gradation or receives a touch. The display panel 100 may be an in-cell touch type display panel using a capacitive scheme. Alternatively, the display panel 100 may be an in-cell touch type display panel using a self-capacitive scheme or an in-cell touch type display panel using a mutual-capacitive scheme.

The display panel 100 includes a plurality of gate lines G1 to Gm, a plurality of data lines D1 to Dn, a plurality of pixels P, a plurality of touch sensors TE, and a plurality of touch lines T1 to Tk.

During the display period DP, each of the plurality of gate lines G1 to Gm receives a scan pulse. During the display period DP, each of the plurality of data lines D1 to Dn receives a data signal. The plurality of gate lines G1 to Gm and the plurality of data lines D1 to Dn are located to intersect with each other on a substrate to define a plurality of pixel regions. Each of the plurality of pixels P may include a thin film transistor (TFT) (not shown) connected to an adjacent gate line and an adjacent data line, a pixel electrode (not shown) connected to the TFT, and a storage capacitor (not shown) connected to the pixel electrode.

Each of the plurality of touch sensors TE may serve as a touch electrode for sensing a touch or serve as a common electrode for forming an electric field together with the pixel electrode to drive a liquid crystal. That is, each of the plurality of touch sensors TE may be used as a touch electrode during the touch sensing period TP and may be used as a common electrode during the display period DP. Accordingly, each of the plurality of touch sensors TE may be made of a transparent conductive material.

Since each of the plurality of touch sensors TE is used as a self-capacitive type touch sensor during the touch sensing period TP, each of the plurality of touch sensor TE should have a size which is greater than a minimum contact size between a touch object and the display panel 100. Accordingly, each of the plurality of touch sensors TE may have a size corresponding to one or more pixels P. The plurality of touch sensors TE may be disposed at regular intervals along a plurality of horizontal lines and a plurality of vertical lines. During display period DP, each of the plurality of touch lines T1 to Tk supplies a common voltage to a corresponding touch sensor TE. The plurality of touch lines T1 to Tk are connected to the plurality of touch sensors TE, respectively.

During the display period DP, the display driving device 210 supplies data signals to the plurality of pixels P included in the display panel 100 to allow an image to be displayed through the display panel 100.

The display driving device 210 includes a timing controller 211, a gate driving device 212, and a data driving device 213.

The timing controller 211 receives various timing signals including a vertical synchronization signal Vsync, a horizontal synchronization signal Hsync, a data enable (DE) signal, and a clock signal CLK from an external system (not shown) and generates a gate control signal (GCS) for controlling the gate driving device 212 and a data control signal (DCS) for controlling the data driving device 213. In addition, the timing controller 211 receives an image signal RGB from the external system, converts the image signal RGB into an image signal RGB' in the form being able to be processed in the data driving device 213, and outputs the image signal RGB'.

Meanwhile, the timing controller 211 may compress an external data enable signal transmitted from the external host system into a preset display period DP, thereby generating an internal data enable signal iDE. The timing controller 211 may generate the touch synchronization signal Tsync for time-dividing one frame period into the display period DP and the touch sensing period TP according to timings of the vertical synchronization signal Vsync and the internal data enable signal iDE. The timing controller 211 may transmit the touch synchronization signal Tsync to the gate driving device 212, the data driving device 213, and a touch controller 222.

The host system converts the digital image data RGB into a format suitable for being displayed on the display panel 100. The host system transmits the timing signals together with the digital image data RGB to the timing controller 211. The host system is implemented as any one among a television system, a set-top box, a navigation system, a digital versatile disc (DVD) player, a blu-ray player, a personal computer (PC), a home theater system, and a phone system and receives an input image.

Meanwhile, the host system may receive touch input coordinates from the touch controller 222 and execute an application program in conjunction with the received touch input coordinates.

During the display period DP, the gate driving device 212 receives the gate control signal GCS from the timing controller 211. The gate control signal GCS may include a gate start pulse GSP, a gate shift clock GSC, and a gate output enable signal. The gate driving device 212 generates a gate pulse (or a scan pulse) synchronized with the data signal through the received gate control signal GCS, shifts the generated gate pulse, and sequentially supplies the shifted gate pulse to the gate lines G1 to Gm. To this end, the gate driving device 212 may include a plurality of gate drive ICs (not shown). During the display period DP, the gate drive ICs sequentially supply the gate pulse synchronized with the data signal to the gate lines G1 to Gm under the control of the timing controller 211 to select a data line through which the data signal is written. The gate pulse swings between a gate high voltage and a gate low voltage.

During the touch sensing period TP, the gate driving device 212 may supply a gate low voltage VGL to the gate lines G1 to Gm without generating the gate pulse. Accordingly, the gate lines G1 to Gm supply the gate pulse to the TFT of each pixel to sequentially select a data line through which the data signal is to be written in the display panel 100 during the display period DP and hold at the gate low voltage VGL during the touch sensing period TP to prevent an output variation of the touch sensors TE.

During the display period DP, the gate driving device 212 receives the data control signal DCS and the image signal RGB' from the timing controller 211. The data control signal DCS may include a source start pulse SSP, a source sampling clock SSC, and a source output enable signal SOE. The source start pulse SSP controls data sampling start timings of n source drive ICs (not shown) constituting the data driving device 213. The source sampling clock SSC is a clock signal that controls a sampling timing of data in each of the n source drive ICs. The source output enable signal SOE controls an output timing of each of the n source drive ICs.

In addition, the data driving device 213 converts the received image signal RGB' into a data signal including analog information and supplies the data signal to the pixels P through the plurality of data lines D1 to Dn.

During the touch sensing period TP, the touch sensing device 220 senses a touch through the touch sensors TE. Specifically, the touch sensing device 220 supplies touch driving signals to the touch sensors TE to drive the touch sensors TE and senses a variation in capacitance generated when the touch sensors TE are touched.

When the display panel 100 is implemented as a mutual-capacitive display panel, as in one embodiment of the present disclosure, the touch controller 222 may include a drive circuit for generating touch driving signals for driving the touch sensors TE and supplying the touch driving signals to the touch sensors TE through the touch lines T1 to Tk, and a sensing circuit for detecting a variation in capacitance of the touch sensors TE through the touch lines T1 to Tk to generate touch sensing data. Alternatively, according to another embodiment of the present disclosure, a read-out IC ROIC may include a drive circuit for generating touch driving signals for driving the touch sensors TE and supplying the touch driving signals to the touch sensors TE through the touch lines T1 to Tk, and a sensing circuit for detecting a variation in capacitance of the touch sensors TE through the touch lines T1 to Tk to generate touch sensing data.

Alternatively, when the display panel 100 is implemented as a self-capacitive type display panel, as in one embodiment of the present disclosure, the touch controller 222 may supply the touch driving signals to the touch sensors TE using a single circuit and acquire touch sensing data from the touch sensors TE. Alternatively, as in another embodiment of the present disclosure, the read-out IC ROIC may supply the touch driving signals to the touch sensors TE using a single circuit and acquire touch sensing data from the touch sensors TE.

During the touch sensing period TP, touch controllers TMCU1 to TMCUq drive the touch sensors TE to acquire touch sensing data from the touch sensors TE.

Referring to FIG. 3, the touch sensing device 220 includes a plurality of touch controllers TMCU1 to TMCUq. Each of the plurality of touch controllers TMCU1 to TMCUq may be connected through a plurality of lines. Specifically, as shown in FIG. 3, first and second touch controllers TMCU1 and TMCU2 may be connected through each chip select terminal CSN, each clock terminal CLK, and each of first to $m^{th}$ input/output terminals DIO1 to DIOm (m is a natural number). Specifically, a chip select terminal CSN of the first touch controller TMCU1 is connected to a chip select terminal CSN of the second touch controller TMCU2 through a chip select bus B_CSN, a clock terminal CLK of the first touch controller TMCU1 is connected to a clock terminal CLK of the second touch controller TMCU2 through a clock bus B_CLK, a first input/output terminal DIO1 of the first touch controller TMCU1 is connected to a first input/output terminal DIO1 of the second touch controller TMCU2 through a first bus B1, a second input/output terminal DIO2 of the first touch controller TMCU1 is connected to a second input/output terminal DIO2 of the second touch controller TMCU2 through a second bus B2, the third input/output terminal DIO3 of the first touch controller TMCU1 is connected to a third input/output terminal DIO3 of the second touch controller TMCU2 through a third bus B3, and an $m^{th}$ input/output terminal DIOm of the first touch controller TMCU1 is connected to an $m^{th}$ input/output terminal DIOm of the second touch controller TMCU2 through an $m^{th}$ bus Bm.

According to one embodiment of the present disclosure, each of the first touch controller TMCU1 and the second touch controller TMCU2 transmits and receives ternary data through the chip select terminal CSN, the clock terminal CLK, and at least two terminals among the first to $m^{th}$ input/output terminals DIO1 to DIOm. That is, each of the first touch controller TMCU1 and the second touch controller TMCU2 transmits and receives ternary data through at least two among the first to $m^{th}$ buses B1 to Bm.

According to one embodiment of the present disclosure, ternary data may correspond to ternary symbol data and may correspond to binary symbol data, which is binary data, as shown in FIG. 5 and Table 1 below.

TABLE 1

| Binary symbol data (binary data) | | | Decimal symbol data | Ternary symbol data (ternary data) | | |
|---|---|---|---|---|---|---|
| B2 | B1 | B0 | | First symbol | Second symbol | Symbol pair |
| 0 | 0 | 0 | 0 | 0 | 0 | 0, 0 |
| 0 | 0 | 1 | 1 | 0 | 1 | 0, 1 |
| 0 | 1 | 0 | 2 | 0 | 2 | 0, 2 |
| 0 | 1 | 1 | 3 | 1 | 0 | 1, 0 |
| 1 | 0 | 0 | 4 | 1 | 1 | 1, 1 |
| 1 | 0 | 1 | 5 | 1 | 2 | 1, 2 |
| 1 | 1 | 0 | 6 | 2 | 0 | 2, 0 |
| 1 | 1 | 1 | 7 | 2 | 1 | 2, 1 |

As shown in Table 1, the binary data (binary symbol data), the decimal symbol data, and ternary data (ternary symbol data) correspond to each other. Accordingly, for example, as shown in FIG. 5, binary data of 100001010010101010 may be divided into (100), (001), (010), (010), (101), and (010), and as shown in Table 1, the pieces of separated data are converted into (11), (01), (02), (02), (12), (02) which are ternary symbols so that the ternary data may be converted into first and second ternary data which are divided based on each bit. In this case, the first and second ternary data may be 0000010101 and 1101000010, respectively. Alternatively, according to a correspondence relationship between a binary data (binary symbol data), a decimal symbol data, and a ternary data (ternary symbol data), the ternary data (ternary symbol data) may be converted into the binary data (binary symbol data). According to one embodiment of the present disclosure, the touch controller 222 may include the plurality of touch controllers TMCU1 to TMCUq. The plurality of touch controllers TMCU1 to TMCUq may transmit and receive data to and from each other using serial peripheral interface (SPI) communication.

Referring to FIG. 3, each of the first and second touch controllers TMCU1 and TMCU2 includes a receiver 222*a*, a converter 222*b*, a transmitter 222*c*, and an internal clock generator 222*d*.

The receiver 222*a* may receive touch sensing data from the touch sensor. In particular, according to one embodiment of the present disclosure, the receiver 222*a* receives ternary data 3data and binary data 2data. Specifically, the receiver 222*a* receives ternary data through the clock terminal CLK and at least two terminals among the first to m$^{th}$ input/output terminals DIO1 to DIOm and receives binary data through the remaining input/output terminals. This will be described in detail below with reference to FIGS. 6, 7B, and 7C.

According to one embodiment of the present disclosure, the receiver 222*a* includes a noise removal filter for removing noise from ternary data 3data and binary data 2data. For example, as shown in FIG. 5, the receiver 222*a* may include filters 3data1_FLT, 3data2_FLT, and 2data1_FLT to 2datam−1_FLT which filter noise of first and second ternary data 3data1 and 3data2 and pieces of binary data 2data1 to 2datam−1), which are received through the clock terminal CLK. Specifically, the filters may filter noise of the first ternary data 3data1 to generate first filtered ternary data 3data1_FLT, filter noise of the second ternary data 3data2 to second filtered ternary data 3data2_FLT, and filter noise of the pieces of binary data 2data1 to 2datam−1 to generate pieces of filtered binary touch sensing data 2data1_FLT to 2datam−1_FLT.

In addition, according to one embodiment of the present disclosure, when the first touch controller TMCU1 does not transmit a chip select signal S_CSN through the chip select terminal CSN, the receiver 222*a* receives event alarm signals S_A1 to S_Am from the second touch controller TMCU2. The receiver 222*a* may determine an event occurring in a corresponding touch controller using the received event alarm signals S_A1 to S_Am and transmit the chip select signal S_CSN to the corresponding touch controller through the chip select terminal CSN. This will be described in detail below with reference to FIGS. 6 and 7A.

According to one embodiment of the present disclosure, the converter 222*b* synchronizes the filtered ternary data with the filtered binary data using an internal clock synchronization signal sync_clk generated by the internal clock generator 222*d* which will be described below. In this way, the pieces of data may be synchronized without transmitting and receiving a separate clock signal, and generation of EMI noise may be prevented.

The converter 222*b* converts ternary data 3data into binary data 2data and converts binary data 2data into ternary data 3data. That is, the converter 222*b* may include a ternary decoder and a ternary encoder.

The transmitter 222*c* may analyze a touch sensing raw signal received from the touch sensor using a preset touch recognition algorithm and calculate coordinate information of a touch input position. The transmitter 222*c* transmits the calculated coordinate information of the touch input position to an external host system. In addition, the transmitter 222*c* may transmit the converted ternary data 3data and the converted binary data 2data to another touch controller TMCU.

The internal clock generator 222*d* generates the internal clock synchronization signal sync_clk which is the basis for data synchronization. According to one embodiment of the present disclosure, since a clock signal is not transmitted/received between the plurality of touch controllers, a separate synchronization between the received ternary data and the received binary data is required. Thus, the internal clock generator 222*d* generates the internal clock synchronization signal sync_clk, which is the basis for data synchronization, and synchronizes data. Specifically, as shown in FIG. 5, the internal clock generator 222*d* generates an internal clock signal clk, and when a rising edge of the internal clock signal clk occurs based on a point of time at which data of the filtered first ternary touch sensing data 3TS1_FLT or the filtered second ternary touch sensing data 3TS2_FLT is changed, the internal clock generator 222*d* forms the internal clock synchronization signal sync_clk.

Hereinafter, a method of driving a touch sensing device according to one embodiment of the present disclosure will be described in detail with reference to FIGS. 6 to 7D.

Figure 6:
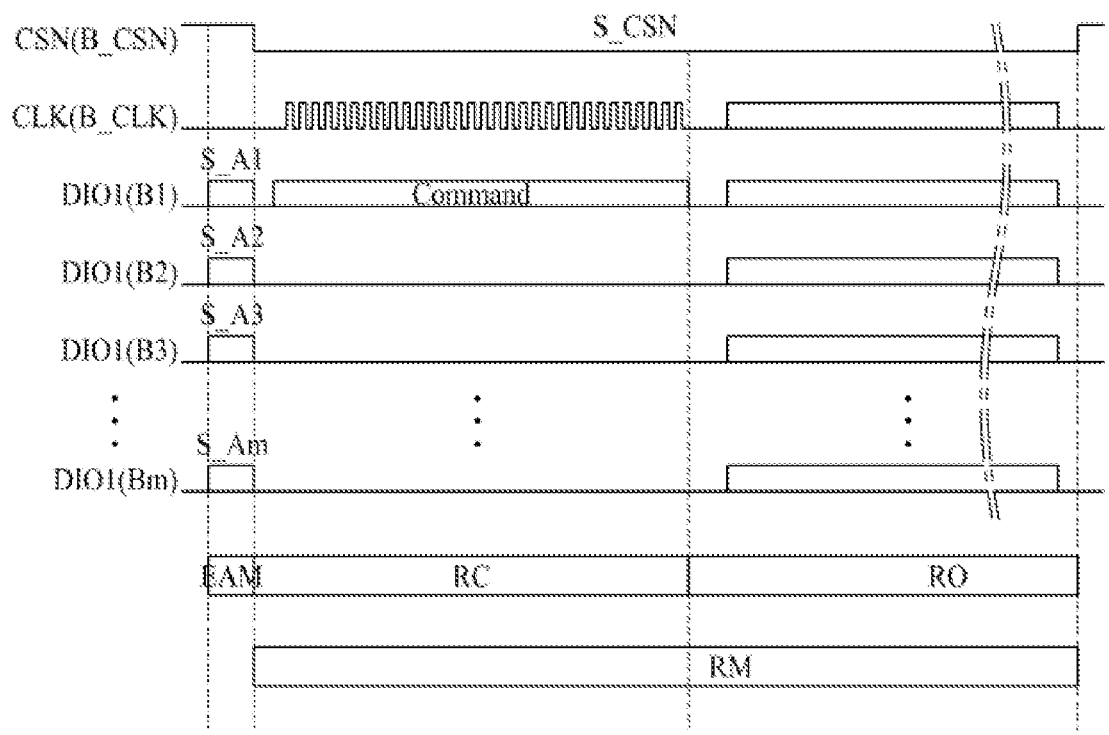
FIG. 6 is a timing diagram of a read mode according to one embodiment of the present disclosure.
Figure 7A:
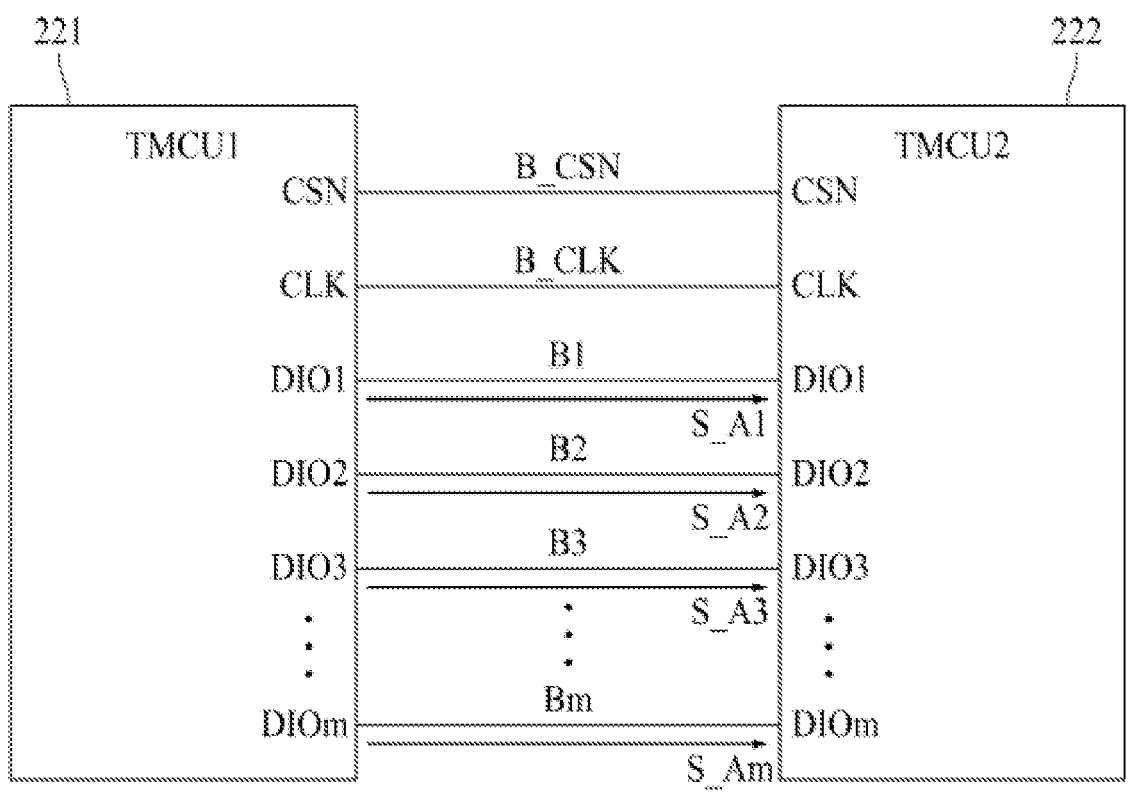
FIG. 7A is a diagram illustrating a data transmission direction in a write mode of the touch sensing device according to one embodiment of the present disclosure.
Figure 7B:
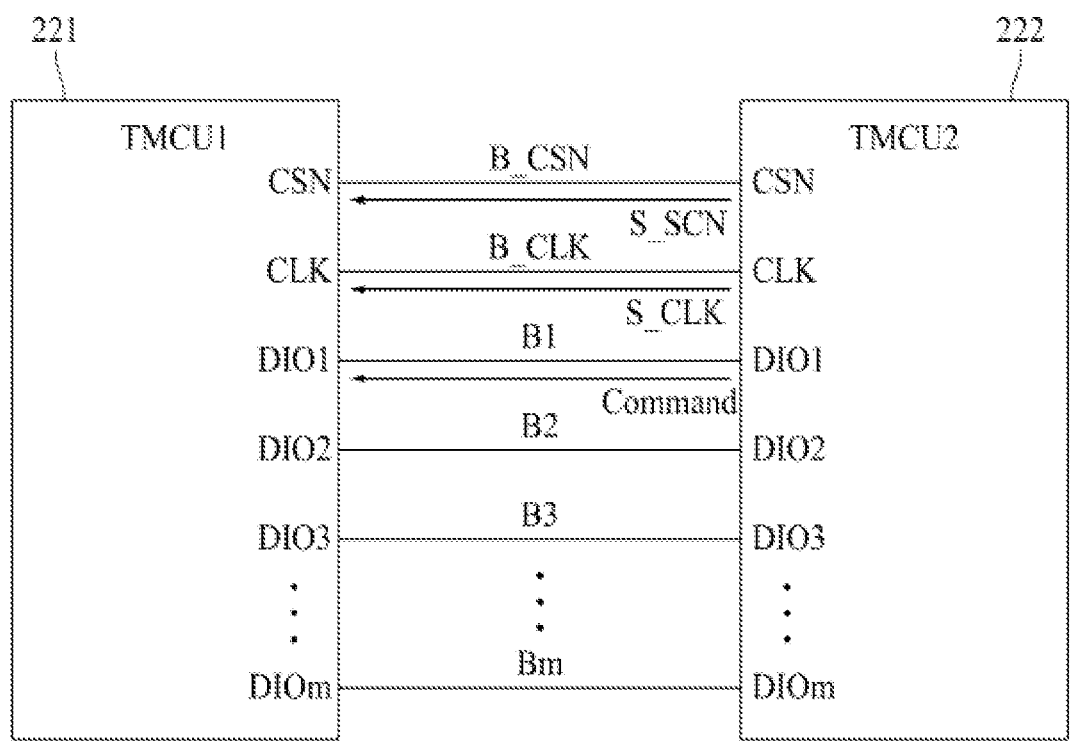
FIG. 7B is a diagram illustrating a data transmission direction in a read request mode of the touch sensing device according to one embodiment of the present disclosure.
Figure 7C:
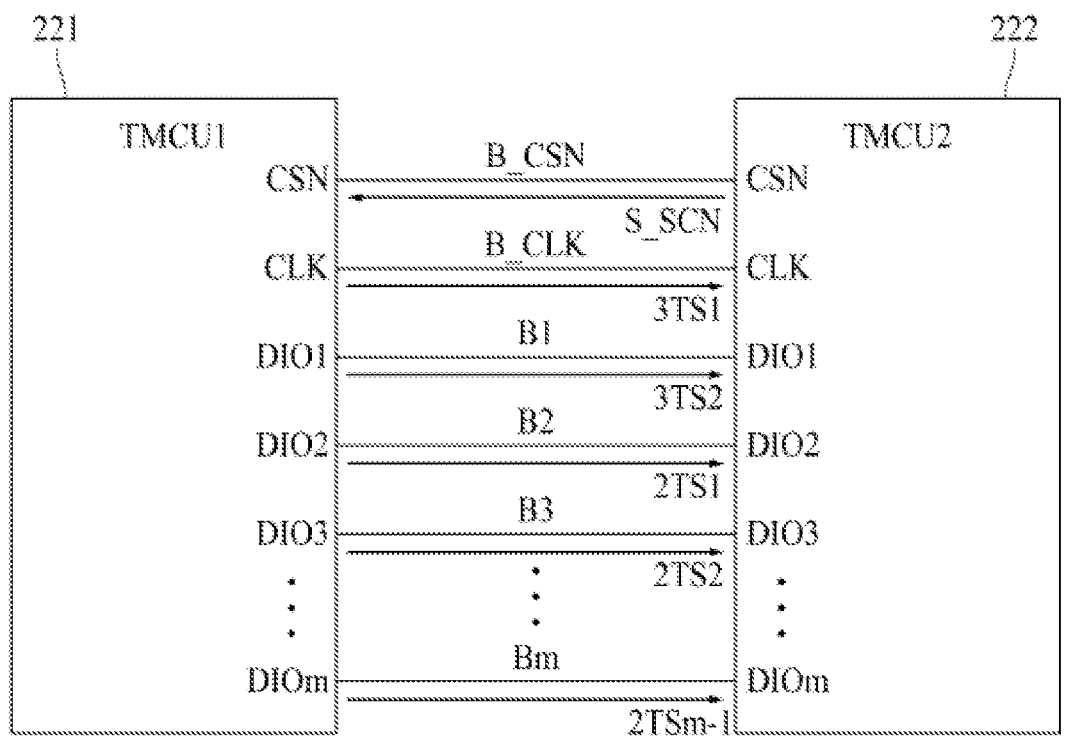
FIG. 7C is a diagram illustrating a data transmission direction in a read operation mode of the touch sensing device according to one embodiment of the present disclosure.
Figure 7D:
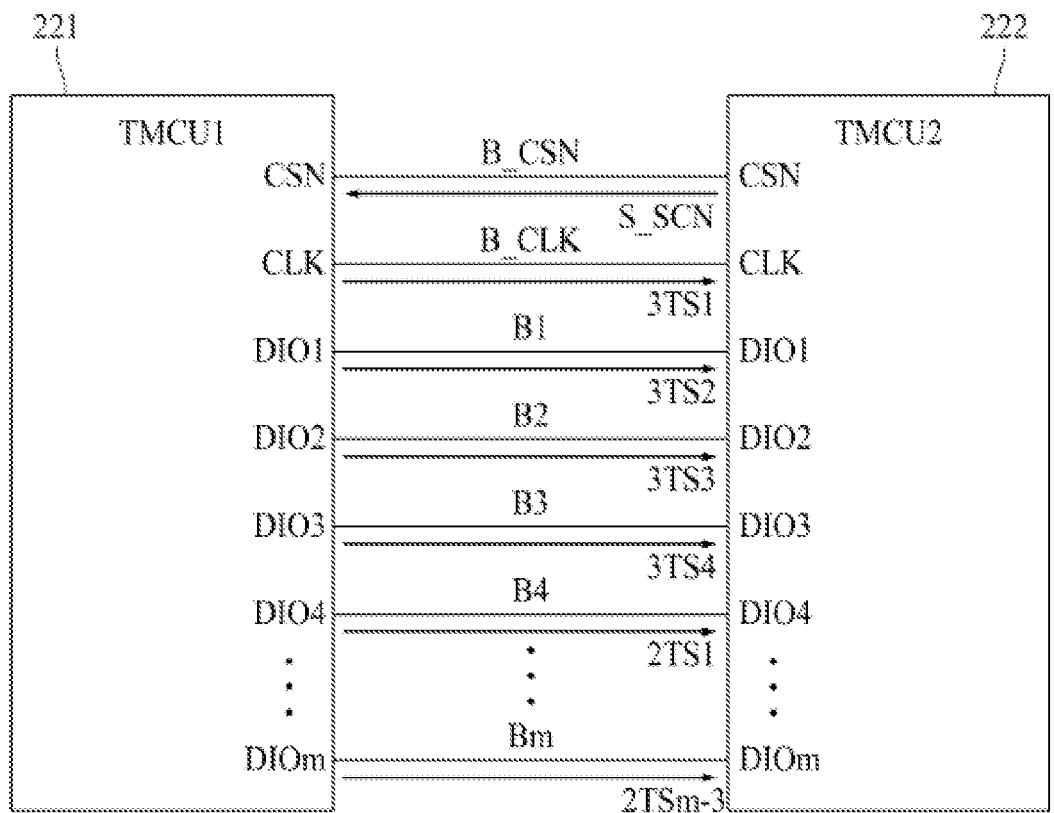
FIG. 7D is a diagram illustrating a data transmission direction in a read operation mode of a touch sensing device according to another embodiment of the present disclosure.

FIG. 6 is a timing diagram of a read mode according to one embodiment of the present disclosure. FIG. 7A is a diagram illustrating a data transmission direction in a write mode of the touch sensing device according to one embodiment of the present disclosure, FIG. 7B is a diagram illustrating a data transmission direction in a read request mode of the touch sensing device according to one embodiment of the present disclosure, FIG. 7C is a diagram illustrating a data transmission direction in a read operation mode of the touch sensing device according to one embodiment of the present disclosure, and FIG. 7D is a diagram illustrating a data transmission direction in a read operation mode of a touch sensing device according to another embodiment of the present disclosure.

The first touch controller TMCU1 and second touch controller TMCU2 may operate in an event alarm mode EAM, a write mode (not shown), or a read mode RM.

According to one embodiment of the present disclosure, when an event occurs, the first touch controller TMCU1 transmits the event alarm signals S_A1 to S_Am, which indicate that the event occurs, to the second touch controller TMCU2. Specifically, when the chip select signal S_CSN is not transmitted from the second touch controller TMCU2, as shown in FIG. 7A, the first touch controller TMCU1 may transmit first to $m^{th}$ alarm signals S_A1 to S_Am notifying occurrence of an event. For example, as shown in FIG. 6, the first touch controller TMCU1 may transmit the event alarm signals S_A1 to S_Am to the second touch controller TMCU2 through the first to $m^{th}$ input/output terminals DIO1 to DIOm. In this case, according to one embodiment of the present disclosure, the first touch controller TMCU1 may transmit alarm signals for different events according to the event alarm signals transmitted through the first to $m^{th}$ input/output terminals DIO1 to DIOm. Accordingly, since the first touch controller TMCU1 transmits the event alarm signals S_A1 to S_Am using the first to $m^{th}$ input/output terminals DIO1 to DIOm, there is no need for a separate terminal and bus to transmit the event alarm signals between the first touch controller TMCU1 and the second touch controller TMCU2 so that the total number of lines between the first touch controller TMCU1 and the second touch controller TMCU2 may be reduced.

The first touch controller TMCU1 and the second touch controller TMCU2 may operate in a write mode. Although not shown in the drawings, the first touch controller TMCU1 receives write data such as initialization data or setting data from the second touch controller TMCU2 in the write mode. Accordingly, the first touch controller TMCU1 may be initialized by the write data or settings thereof may be changed. For example, the first touch controller TMCU1 may transmit the chip select signal S_CSN through the chip select terminal CSN, transmit the clock signal S_CLK through the clock terminal CLK, and transmit write data through the first input/output terminal DIO1.

The first touch controller TMCU1 and the second touch controller TMCU2 may operate in the read mode RM. As shown in FIG. 6, the read mode RM includes a read request mode RC and a read operation mode RO. In this case, according to one embodiment of the present disclosure, in the read mode RM, the second touch controller TMCU2 transmits a chip select signal S_CSN to the second touch controller TMCU2 which is a touch controller to communicate.

Referring to FIGS. 6 and 7B, in the read request mode RC, the second touch controller TMCU2 requests data from the first touch controller TMCU1. Specifically, the second touch controller TMCU2 transmits a clock signal S_CLK through the clock bus B_CLK to the first touch controller TMCU1 and transmits a read request signal command through the first bus B1 thereto. That is, in the read request mode RC, the clock bus B_CLK is used to transmit the clock signal S_CLK, and the first bus B1 is used to transmit the read request signal command.

Referring to FIGS. 6 and 7C, in the read operation mode RO, the first touch controller TMCU1 transmits touch sensing data to the second touch controller TMCU2. Specifically, the first touch controller TMCU1 transmits first and second ternary data 3data1 and 3data2 and first to $(m-1)^{th}$ binary data 2data1 to 2datam-1 to the second touch controller TMCU2 through the clock bus B_CLK and the first to $m^{th}$ input/output terminals DIO1 to DIOm. In particular, according to one embodiment of the present disclosure, in the read operation mode RO, the first touch controller TMCU1 transmits the first and second ternary data 3data1 and 3data2 through a clock bus B_CLK and at least two among the first to $m^{th}$ input/output terminals DIO1 to DIOm. For example, as shown in FIGS. 6 and 7C, in the read operation mode RO, the first touch controller TMCU1 may transmit the first ternary data 3data1 through the clock bus B_CLK, transmit the second ternary data 3data2 through a first bus B1, and transmit the first to $(m-1)^{th}$ binary data 2data1 to 2datam-1 through second to $m^{th}$ buses B2 to Bm. Alternatively, as shown in FIG. 7D, in the read operation mode RO, the first touch controller TMCU1 may transmit the first ternary data 3data1 through the clock bus B_CLK, transmit the second ternary data 3data2 through the first bus B1, transmit third ternary data 3data3 through the second bus B2, transmit fourth ternary data 3data4 through the third bus B3, and transmit first to $(m-3)^{th}$ binary data 2data1 to 2datam-3 through fourth to $m^{th}$ buses B4 to Bm.

According to one embodiment of the present disclosure, in the read operation mode RO, the first touch controller TMCU1 transmits the pieces of ternary data through the clock bus B_CLK and at least two among the first to $m^{th}$ input/output terminals DIO1 to DIOm and transmits the pieces of binary data through the clock bus B_CLK and the remaining input/output terminals among the first to $m^{th}$ input/output terminals DIO1 to DIOm. That is, according to one embodiment of the present disclosure, in the read operation mode RO, the first touch controller TMCU1 may transmit at least a portion of data to be transmitted as ternary data and transmit the remaining thereof as binary data.

In addition, since the clock signal is not applied to the second touch controller TMCU2 in the read operation mode RO in which the touch sensing data is transmitted, EMI noise due to the clock signal may be prevented.

Hereinafter, another embodiment of the present disclosure will be described in detail with reference to FIGS. 8 and 9.

Figure 8:
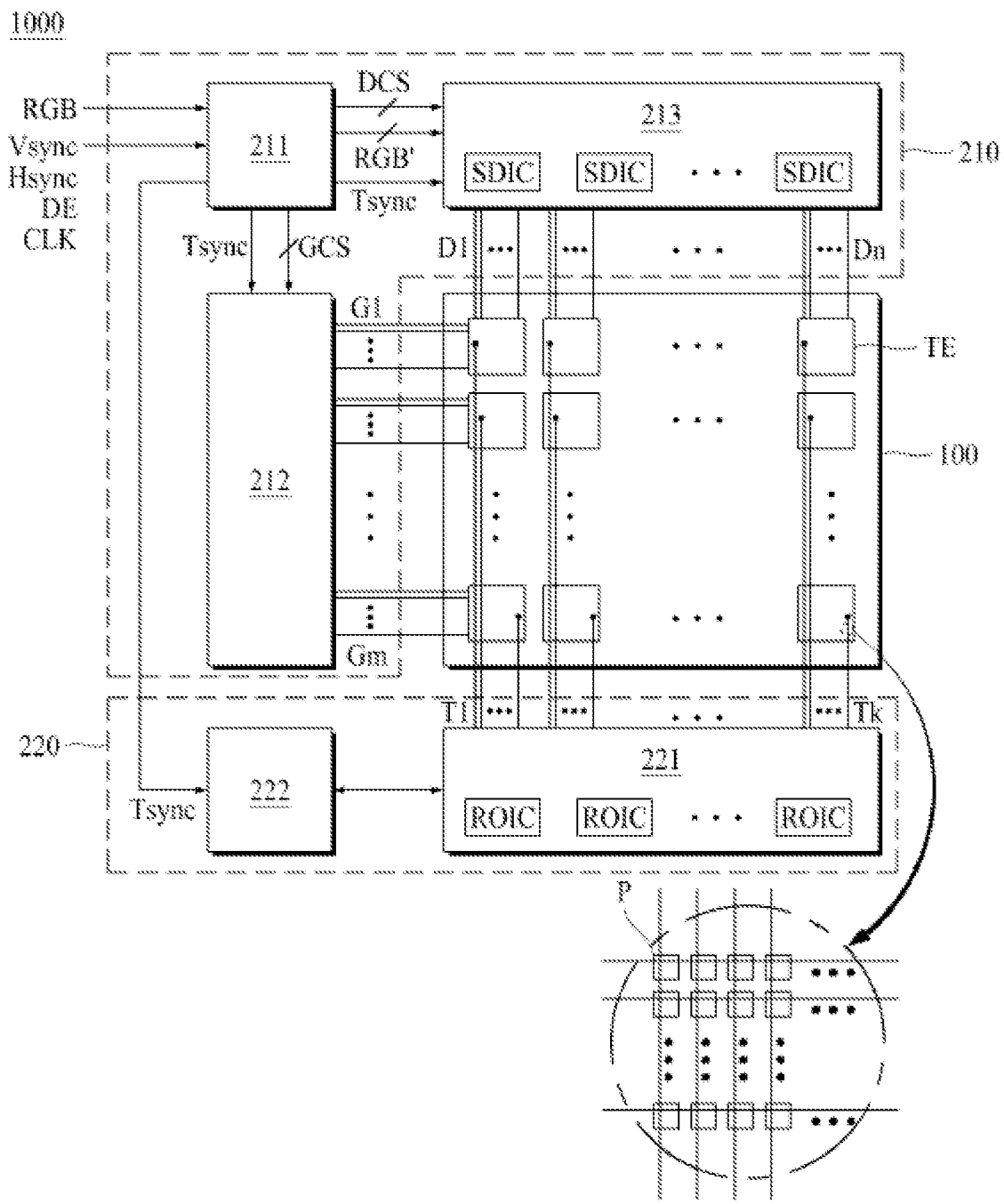
FIG. 8 is a block diagram illustrating a display device including a touch sensing device according to another embodiment of the present disclosure.
Figure 9:
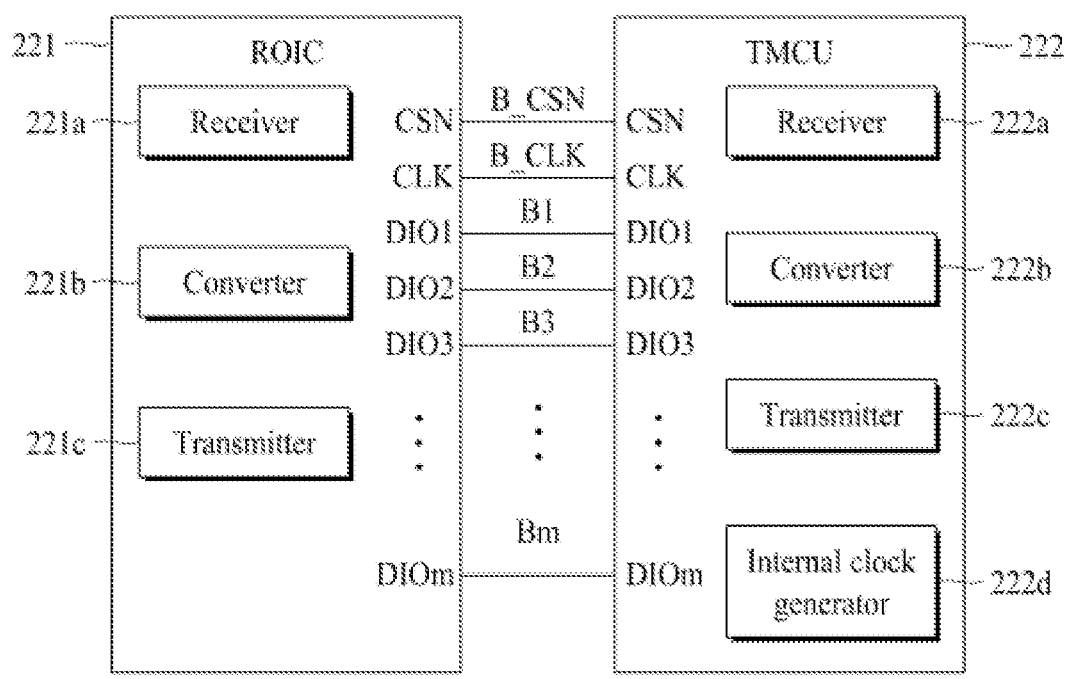
FIG. 9 is a diagram illustrating a connection relationship between a readout integrated circuit and a touch controller according to another embodiment of the present disclosure.

FIG. 8 is a block diagram illustrating a display device including a touch sensing device according to another embodiment of the present disclosure, and FIG. 9 is a diagram illustrating a connection relationship between a readout integrated circuit and a touch controller according to another embodiment of the present disclosure.

Referring to FIG. 8, according to another embodiment of the present disclosure, a touch sensing device 220 includes a touch driving device 221 and a touch controller 222.

The touch driving device 221 may include a plurality of readout integrated circuits ROIC1 to ROICn (n is a natural number). Each of the plurality of readout integrated circuits ROIC1 to ROICn may be connected to the touch controller 222 through a plurality of lines. Specifically, referring to FIG. 9, the readout integrated circuit ROIC and the touch controller 222 may be connected through each chip select terminal CSN, each clock terminal CLK, and each of first to $m^{th}$ input/output terminals DIO1 to DIOm (m is a natural number). Specifically, the chip select terminal CSN of the readout integrated circuit ROIC is connected to a chip select terminal CSN of the touch controller 222 through a chip select bus B_CSN, the clock terminal CLK of the readout integrated circuit ROIC is connected to a clock terminal CLK of the touch controller 222 through a clock bus B_CLK, a first input/output terminal DIO1 of the readout integrated circuit ROIC is connected to a first input/output terminal DIO1 of the touch controller 222 through a first bus B1, a second input/output terminal DIO2 of the readout integrated circuit ROIC is connected to a second input/output terminal DIO2 of the touch controller 222 through a second bus B2, a third input/output terminal DIO3 of the readout integrated circuit ROIC is connected to a third input/output terminal DIO3 of the touch controller 222 through a third bus B3, and an $m^{th}$ input/output terminal DIOm of the readout integrated circuit ROIC is connected to an $m^{th}$ input/output terminal DIOm of the touch controller 222 through an $m^{th}$ bus Bm.

According to one embodiment of the present disclosure, each of the readout integrated circuit ROIC and the touch controller 222 transmits and receives ternary data through the chip select terminal CSN, the clock terminal CLK, and at least two terminals among the first to $m^{th}$ input/output terminals DIO1 to DIOm. That is, each of the readout integrated circuit ROIC and the touch controller 222 transmits and receives ternary data through at least two among the first to $m^{th}$ buses B1 to Bm.

According to one embodiment of the present disclosure, as shown in FIG. 9, the readout integrated circuit ROIC includes a receiver 221a, a converter 221b, and a transmitter 221c.

The receiver 221a receives a touch sensing raw signal generated from the touch sensor TE and generates binary touch sensing data using the received touch sensing raw signal.

In addition, the receiver 221a receives a signal from the touch controller 222. Specifically, the receiver 221a receives a signal such as a read request signal through the chip select terminal CSN, the clock terminal CLK, and the first to $m^{th}$ input/output terminals DIO1 to DIOm of the readout integrated circuit ROIC.

The converter 221b generates binary touch sensing data using the received touch sensing raw data.

In addition, according to one embodiment of the present disclosure, in a read operation mode RO which will be described below, the readout integrated circuit ROIC may transmit at least a portion of the pieces of data to be transmitted as pieces of ternary data and transmit the remaining thereof as pieces of binary data. To this end, the converter 221b converts at least a portion of the binary touch sensing data into ternary touch sensing data 3TS. That is, the converter 221b may convert at least a portion of binary touch sensing data 2TS received from the receiver 221a into ternary touch sensing data 3TS. The converter 221b may include a ternary encoder.

The transmitter 221c transmits the ternary touch sensing data 3TS received from the converter 221b to the touch controller 222 through the chip select terminal CSN, the clock terminal CLK, and the first to $m^{th}$ input/output terminals DIO1 to DIOm.

In addition, according to one embodiment of the present disclosure, when an event corresponding to receiving the touch sensing raw signal occurs, the transmitter 221c may transmit event alarm signals S_A1 to S_Am to the touch controller 222. Specifically, when an event occurs in the readout integrated circuit ROIC, the transmitter 221c may transmit an event alarm signal including the plurality of event alarm signals S_A1 to S_Am, which are transmitted through the clock terminal CLK and the first to $m^{th}$ input/output terminals DIO1 to DIOm, to the touch controller 222. Specifically, when the chip select signal S_CSN is not transmitted from the touch controller 222, the transmitter 221c may transmit first to $m^{th}$ alarm signals S_A1 to S_Am notifying occurrence of the event. For example, the transmitter 221c may transmit the event alarm signals S_A1 to S_Am to the touch controller 222 through the first to $m^{th}$ input/output terminals DIO1 to DIOm. In this case, according to one embodiment of the present disclosure, transmitter 221c may transmit alarm signals for different events according to the event alarm signals transmitted through the first to $m^{th}$ input/output terminals DIO1 to DIOm.

In the above-described embodiments, although source drive integrated circuits SDIC and a plurality of readout integrated circuits ROIC1 to ROICn have been illustrated as being implemented as separate components, the source drive integrated circuits SDIC and the plurality of readout integrated circuits ROIC1 to ROICn may be integrated into one chip.

According to the embodiments of the present disclosure, the number of lines connecting between a plurality of touch controllers or the number of lines connecting between a plurality of readout integrated circuits and a touch controller can be reduced, and electromagnetic interference (EMI) noise can be reduced.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:

1. A touch sensing device comprising:
   a first touch controller configured to transmit and receive data including ternary data and binary data,
   wherein the first touch controller includes a clock terminal and a plurality of input/output terminals,
   wherein the first touch controller comprises:
      a receiver configured to receive the ternary data and the binary data and filter the ternary data and the binary data; and
      an internal clock generator configured to generate an internal clock synchronization signal to synchronize the filtered ternary data with the filtered binary data; and
   wherein the ternary data is transmitted and received through the clock terminal and at least two terminals among the plurality of input/output terminals of the first touch controller, and the binary data is transmitted through the remaining input/output terminals.

2. The touch sensing device of claim 1, further comprising a second touch controller which includes a clock terminal and a plurality of input/output terminals and which transmits and receives ternary data through the clock terminal and at least two terminals among the plurality of input/output terminals of the second touch controller and transmits binary data through the remaining input/output terminals.

3. The touch sensing device of claim 2, wherein the clock terminal and the plurality of input/output terminals of the first touch controller and the clock terminal and the plurality of input/output terminals of the second touch controller are connected to each other through a chip select bus, a clock bus, and a plurality of buses.

4. The touch sensing device of claim 2, wherein:
the first and second touch controllers operate in an event alarm mode and a read mode; and
in the event alarm mode, the first touch controller transmits a plurality of alarm signals through the clock terminal and at least some of the plurality of input/output terminals of the first touch controller.

5. The touch sensing device of claim 2, wherein:
the first touch controller further includes a chip select terminal;
the first touch controller and the second touch controller operate in an event alarm mode and a read mode; and
in the read mode, the first touch controller receives a chip select signal through the chip select terminal and transmits the ternary data and the binary data through the clock terminal and the plurality of input/output terminals of the first touch controller.

6. The touch sensing device of claim 1, wherein the first touch controller includes:
a converter configured to synchronize the filtered ternary data with the filtered binary data using the internal clock synchronization signal and convert the synchronized ternary data into binary data; and
a transmitter configured to calculate and transmit coordinate information of a touch input position using the synchronized binary data and the converted binary data.

7. The touch sensing device of claim 6, wherein:
the converter converts at least a portion of the binary data generated by the first touch controller and the second touch controller into ternary data; and
the transmitter transmits the converted ternary data and the remaining binary data.

8. The touch sensing device of claim 1, wherein the internal clock generator generates the internal clock synchronization signal based on a rising edge of an internal clock signal generated after a value of the filtered ternary data is changed.

9. The touch sensing device of claim 2, wherein the second controller includes:
a receiver configured to receive the ternary data and the binary data and filter the ternary data and the binary data;
an internal clock generator configured to generate an internal clock synchronization signal to synchronize the filtered ternary data with the filtered binary data;
a converter configured to synchronize the filtered ternary data with the filtered binary data using the internal clock synchronization signal and convert the synchronized ternary data into binary data; and
a transmitter configured to calculate and transmit coordinate information of a touch input position using the synchronized binary data and the converted binary data.

10. A touch sensing device comprising:
a touch driving device including at least one readout integrated circuit configured to receive touch sensing raw data from a touch sensor, and
a touch controller configured to receive touch sensing data from the touch driving device and transmits coordinate information of a touch input position to an external host system,
wherein the readout integrated circuit includes a clock terminal and a plurality of input/output terminals, generates ternary touch sensing data and binary touch sensing data using the touch sensing raw data, transmits the ternary touch sensing data through the clock terminal and at least two terminals among the plurality of input/output terminals, and transmits the binary touch sensing data through the remaining input/output terminals, and
wherein the touch controller includes:
a receiver configured to receive ternary data and binary data and filter the ternary data and the binary data; and
an internal clock generator configured to generate an internal clock synchronization signal to synchronize the filtered ternary data with the filtered binary data.

11. The touch sensing device of claim 10, wherein the touch controller receives the ternary sensing data through the clock terminal and at least two terminals among the plurality of input/output terminals and receives the binary touch sensing data through the remaining input/output terminals.

12. The touch sensing device of claim 10, wherein:
the touch driving device and the touch controller operate in an event alarm mode and a read mode; and
in the event alarm mode, the touch controller transmits a plurality of alarm signals through the clock terminal and at least some of the plurality of input/output terminals.

13. The touch sensing device of claim 10, wherein:
the readout integrated circuit further includes a chip select terminal;
the touch driving device and the touch controller operate in an event alarm mode and a read mode; and
in the read mode, the readout integrated circuit receives a chip select signal through the chip select terminal and transmits the ternary touch sensing data and the binary touch sensing data through the clock terminal and the plurality of input/output terminals.

14. The touch sensing device of claim 10, wherein the readout integrated circuit includes:
a receiver configured to receive the touch sensing raw data from the touch sensor;
a converter configured to generate binary touch sensing data using the touch sensing raw data and convert at least a portion of the binary touch sensing data into ternary touch sensing data; and
a transmitter configured to transmit the remaining binary touch sensing data and the ternary touch sensing data.

15. The touch sensing device of claim 10, wherein the touch controller includes:
a converter configured to synchronize the filtered ternary data with the filtered binary data using the internal clock synchronization signal and convert the synchronized ternary data into binary data; and
a transmitter configured to calculate and transmit coordinate information of a touch input position using the synchronized binary data and the converted binary data.

16. The touch sensing device of claim 15, wherein the internal clock generator generates the internal clock synchronization signal based on a rising edge of an internal clock signal generated after a value of the filtered ternary data is changed.

\* \* \* \* \*